Patented Oct. 25, 1932

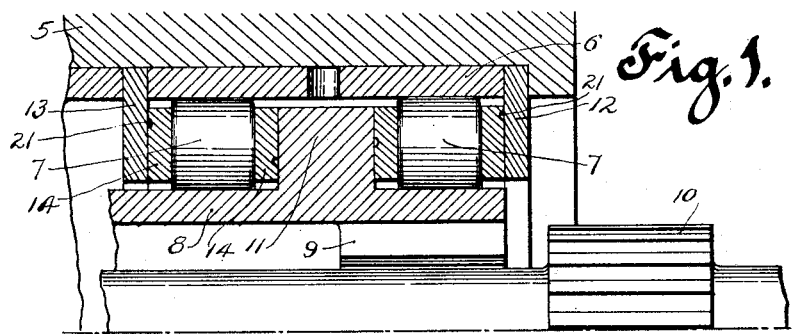
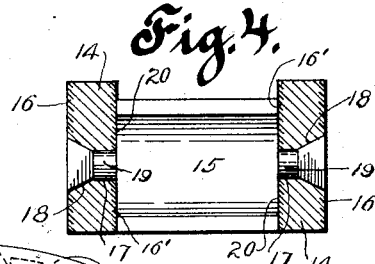
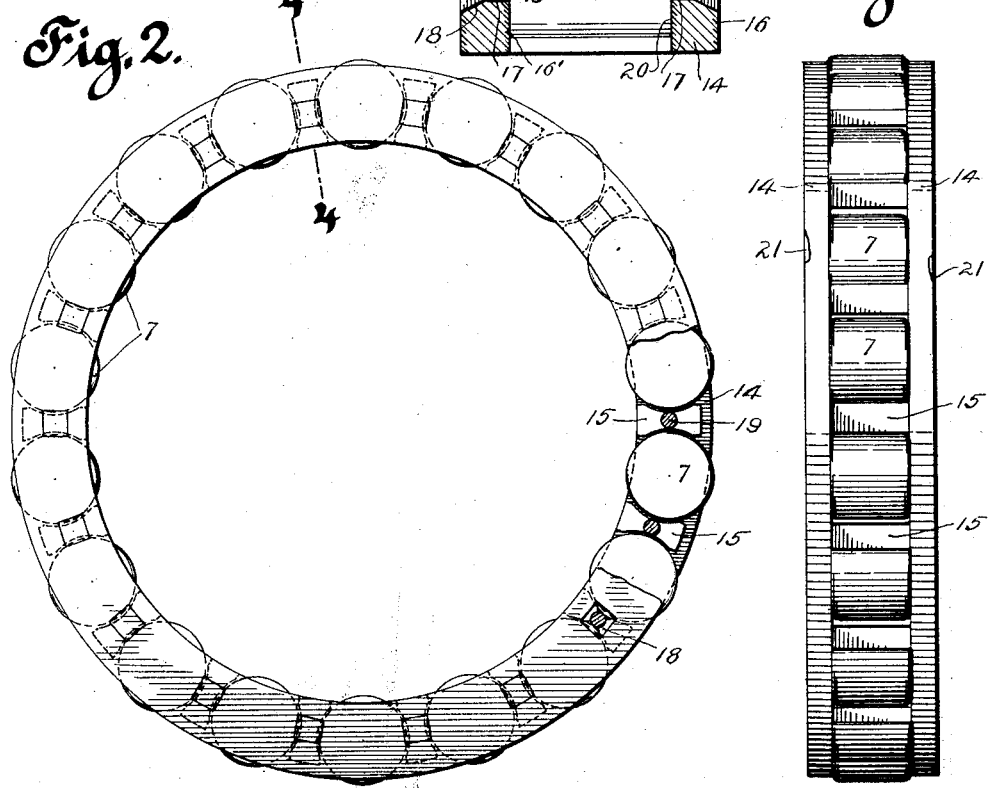

1,884,299

UNITED STATES PATENT OFFICE

RAYMOND R. SEARLES AND FAYETTE LEISTER, OF NEW BRITAIN, CONNECTICUT, ASSIGNORS TO THE FAFNIR BEARING COMPANY, OF NEW BRITAIN, CONNECTICUT, A CORPORATION OF CONNECTICUT

BEARING

Application filed September 24, 1929. Serial No. 394,753.

The invention relates to anti-friction bearings, and more particularly to a retainer therefor.

In most cases a retainer for anti-friction bearings merely functions as a spacer and retainer for the bearing elements and is not designed to, and ordinarily does not, contact with any other elements. There are cases, however, more particularly in connection with roller bearings employing cylindrical rolls, where the retainer member is designed to and does not only properly space the rollers, but contacts with another element and takes end thrusts. The latter type of retainer is subject to considerable wear and such retainers as heretofore made have been relatively expensive and do not have as high a degree of resistance to wear as is desirable.

It is the general object of this invention to provide a retainer for anti-friction bearings, which will satisfactorily take end thrusts and which will be of strong, rigid construction, relatively cheap to manufacture, and which will have a high degree of resistance to wear. Other objects and features of the invention will be set forth in or will be apparent upon a reading of the specification.

Briefly stated, in the preferred form, the retainer includes separate side plates formed preferably of steel, which may be heat treated or otherwise treated, so as to provide hard bearing surfaces to resist wear. The side plates are secured to each other, preferably through spacer members, which may have integral rivet portions thereon, riveted to the side plates. Anti-friction bearing elements, such as cylindrical rollers, are spaced apart by the spacer members and held between the said plates. The connections between the spacer members and side plates are preferably such that the spacer members are prevented from any movement, whether longitudinal, transverse or rotative, relatively to the side plates.

In the drawing which shows, for illustrative purposes only, a preferred form of the invention—

Fig. 1 is a fragmentary view of an automobile transmission illustrating features of the invention;

Fig. 2 is a view in side elevation of a retainer, illustrating features of the invention, parts being broken away for illustration;

Fig. 3 is a view in edge elevation of parts shown in Fig. 2; and

Fig. 4 is an enlarged sectional view, taken substantially in the plane of the line 4—4 of Fig. 2.

In said drawing, 5 indicates a housing member, which may be the transmission casing of an automobile herein illustrated to show a practical application of the improved anti-friction bearing. 6 indicates a metal sleeve, constituting an outer bearing ring or race for anti-friction bearing members, such as cylindrical rollers 7—7, two sets of which are shown. The inner raceways for the rollers 7—7, in the illustrative drawing are formed directly on the surface of a sleeve 8, which may carry or have formed thereon an internal gear 9 for coaction with a slidable pinion 10. The internal gear sleeve 8 in the instance shown is provided with an abutment member 11, interposed between the two sets of anti-friction bearings 7—7. 12 indicates an abutment member carried by the casing 5, while 13 indicates a second abutment member, also carried by the casing. Each set of anti-friction bearing elements 7—7 is carried in a retainer, including side plates 14—14, spaced apart by spacer members 15—15. The retainer is designed to take end thrusts, since the roller members themselves, as illustrated, run on surfaces without grooves, and consequently are not adapted to resist end thrusts.

Between the roller elements 7—7 and the side plates 14—14 of the retainer member there is suitable clearance so as to permit a free rolling of the rollers between the side plates, and proper running clearance is likewise provided between the retainer side plates 14—14 and the abutments such as 11—12—13.

In the operation of the mechanism illustrated in Fig. 1 the slidable pinion 10 is shifted into and out of engagement with the internal gear 9. Such movement of the pinion 10 causes a thrust to be put upon the sleeve 8, due either to improper engagement of the teeth of the gears 9—10, or to the frictional forces or both. Such thrusts on the sleeve 8 may first cause the rollers to engage the side plate at one side or the other depending upon the direction of thrust and thereafter such thrusts are taken by the side plates 14—14 fitting between the abutments 11—12 or 11—13, depending upon the direction of the thrust. The side plates 14—14 are therefore subjected to wear where they contact with the abutments and also where the ends of the rollers engage said plates, and the side plates must be quite rigidly held relatively to each other, in order to properly take such thrusts.

A particular feature of the invention resides in forming hard, smooth, wear-resisting bearing surfaces on the plates 14 of the retainer, so that wear will be reduced to a minimum.

In the preferred form of retainer the side plates 14 are formed of steel, and these plates are heat treated so as to form hard surfaces 16, 16′ (Fig. 4) upon the wear surfaces. While a hard skin is shown only on the wear surfaces, ordinary heat treatment would cause such hardened section or skin to be formed on all of the exposed surfaces of the ring. The hard wear surfaces might be otherwise formed, as by chromium plating the surfaces, but, as stated, the method at present preferred is to form the hard wear surfaces by heat treatment. The interior portion of each ring is preferably left relatively soft, so that the finished ring will be relatively tough and yet have wear surfaces of suitable hardness and texture to resist wear. In lieu of employing relatively cheap steel and carburizing or otherwise treating the same to form thin wear surfaces we may obtain the requisite hardness or toughness in deep hardening stock by properly alloying the material.

In the preferred method of making the retainer, the side plates or rings 14—14 are stamped out or otherwise formed before heat treating and while the metal is relatively soft. Rivet holes 17—17 are punched or otherwise made through the side plates, and the rivet holes may be angular or have an angularly shaped portion 18, which may be formed as by a countersink punch. The punched rings are then heat treated to form the hardened surfaces, as indicated. After heat treatment the spacers 15—15 are interposed between two rings. Each spacer is preferably provided with integral rivet portions 19, to extend through the apertures 17—17 formed in the opposite rings. These rivet portions 19—19 are then upset, so as to rigidly secure the rings 14—14 to each other, and against quite accurately formed abutment surfaces 20—20 at the sides of the spacers. With angular rivets or rivets having angular portions fitting corresponding portions in the side plates, the spacers 15—15 are rigidly held against any rotative movement and the roller elements 7 properly held in place with the requisite clearance. The assembled retainers are then finished, as by grinding or lapping the outer wear surfaces 16, 16, so as to produce a retainer having smooth, hard, wear-resisting bearing surfaces. If desired, the side plates 14—14 may be provided with oil grooves 21—21 of any desired shape or form, so as to properly lubricate the surfaces between the retainer and its abutments. Such oil grooves are preferably formed before heat treatment of the side plates. The inner surfaces 16′, 16′ which at times contact with the roller ends need not ordinarily be ground since the thrusts between such surfaces and the ends of the rollers are relatively slight, but if desired the inner surfaces also may be ground before the plates are assembled with the spacers.

A further advantage in hardening the bearing surfaces of the side plates 14—14 is that, during riveting, the metal adjacent the rivet holes is not peened to any unreasonable degree, and the amount of metal to be removed by grinding is thus relatively small. The hardened surfaces furthermore prevent the rings from curling or becoming substantially distorted during riveting, as sometimes happens with soft metal.

A retainer as herein disclosed is of rugged and strong construction, the parts are relatively cheap to manufacture, and the hardened bearing surfaces resist wear so that there will not be undue looseness or irregularity after extended use.

While the invention has been described in considerable detail and one illustrative practical application of the invention illustrated in Fig. 1, it is to be understood that various changes, omissions and additions may be made within the scope of the invention as defined in the appended claims.

We claim:

1. A bearing assembly comprising an outer bearing race, an inner bearing race, anti-friction bearing members interposed between said races, a retainer member for the anti-friction members comprising a pair of annular side plates provided with countersunk holes, shouldered spacer and mounting members positioned between the side plates, the side plates bearing against the shoulders of the spacer members and being held apart by said shoulders, the spacer members being provided with rivet extensions passing through the holes in the side plates, the rivet heads being upset in the countersunk holes and having their outer surfaces substantially flush with the outside surfaces of the annular plates, and abutment members associated with said inner and outer bearing races, respectively, and placed to bear against the outsides of the side plates of the retainer member.

2. A bearing assembly comprising an outer bearing race, an inner bearing race, anti-friction bearing members interposed between said races, a retainer member for the anti-friction members comprising a pair of annular side plates provided with countersunk holes, shouldered spacer and mounting members positioned between the side plates, the side plates bearing against the shoulders of the spacer members and being held apart by said shoulders, the spacer members being provided with rivet extensions passing through the holes in the side plates, the rivet heads being upset in the countersunk holes and having their outer surfaces substantially flush with the outside surfaces of the annular plates, the sides of the side plates being provided with hard-metal wear-resisting surfaces, and abutment members associated with said inner and outer bearing races, respectively, and placed to bear against the outsides of the side plates of the retainer member.

RAYMOND R. SEARLES.
FAYETTE LEISTER.